Dec. 23, 1930.  F. BAUMGARTNER  1,785,759
PRESSURE CONTROL VALVE
Filed June 18, 1928   2 Sheets-Sheet 1
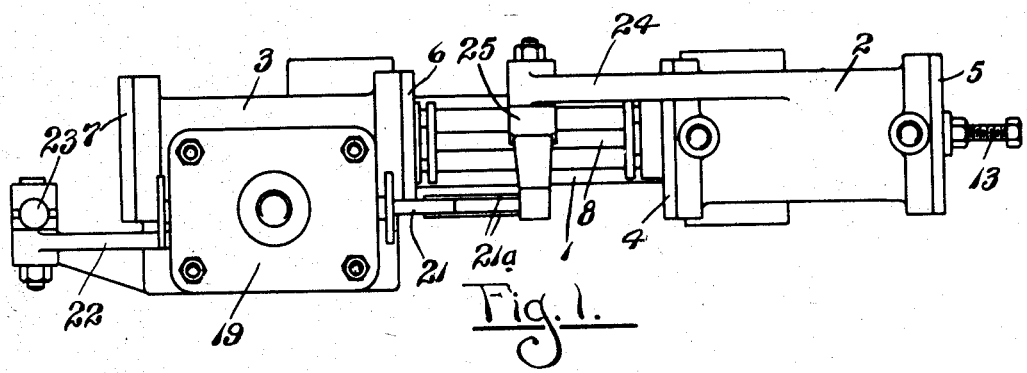
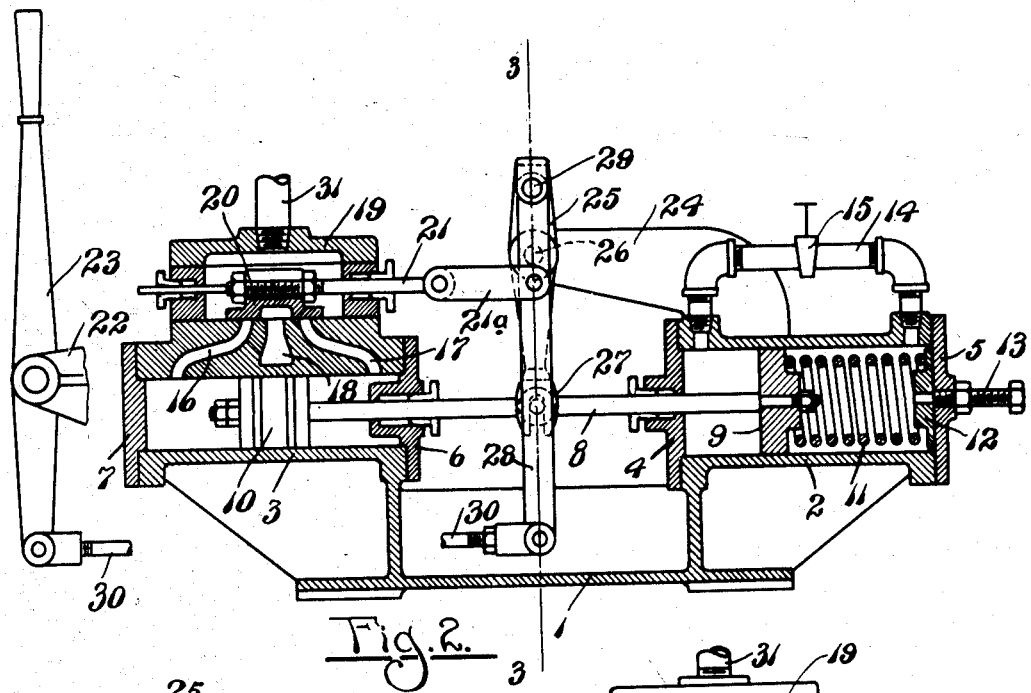
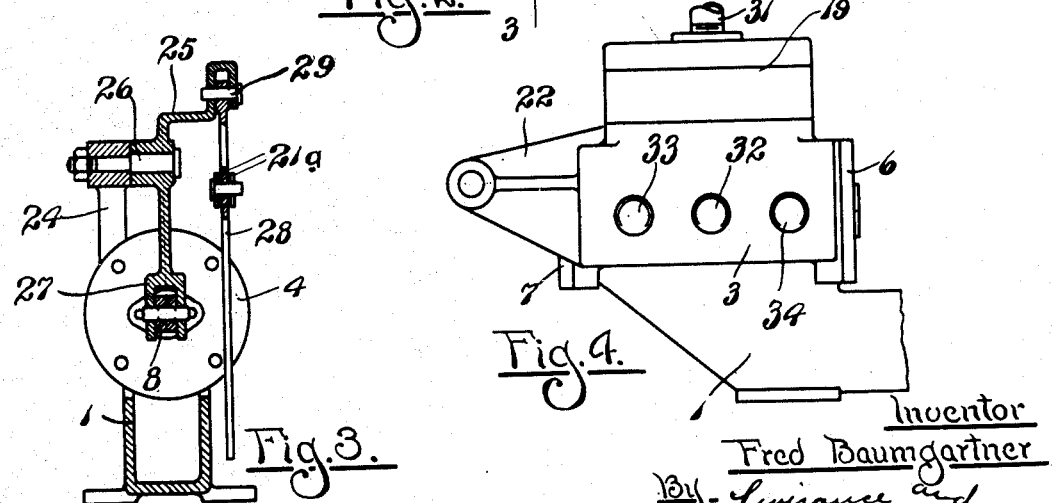
Inventor
Fred Baumgartner
By Lawrence and
Van Antwerp
Attorneys Dec. 23, 1930. F. BAUMGARTNER 1,785,759
PRESSURE CONTROL VALVE
Filed June 18, 1928  2 Sheets-Sheet 2

Inventor
Fred Baumgartner

Patented Dec. 23, 1930

1,785,759

UNITED STATES PATENT OFFICE

FRED BAUMGARTNER, OF MUSKEGON, MICHIGAN

PRESSURE-CONTROL VALVE

Application filed June 18, 1928. Serial No. 286,101.

This invention relates to a pressure control apparatus by means of which the pressure of a fluid which is variable and/or greater than a constant pressure desired for use can be controlled to provide the constant or variable pressure desired. The apparatus also is available for completely shutting off the pressure when needed. The apparatus may be used in conjunction with a variety of devices, one place of use being for applying pressure to a brake.

The invention consists of many novel details of construction and arrangements of parts for effectively attaining the ends stated, as well as many others not at this time enumerated, which will appear upon understanding of the invention from the following description taken in connection with the accompanying drawings, in which:

Fig. 1 is a plan view of the apparatus.

Fig. 2 is a longitudinal vertical section therethrough with certain parts broken away for clearness of disclosure.

Fig. 3 is a vertical section substantially on the plane of line 3—3 of Fig. 2.

Fig. 4 is a fragmentary side elevation of the apparatus shown in Fig. 1, the elevation being that part of the apparatus at the left.

Like reference characters refer to like parts in the different figures of the drawings.

Figure 5:
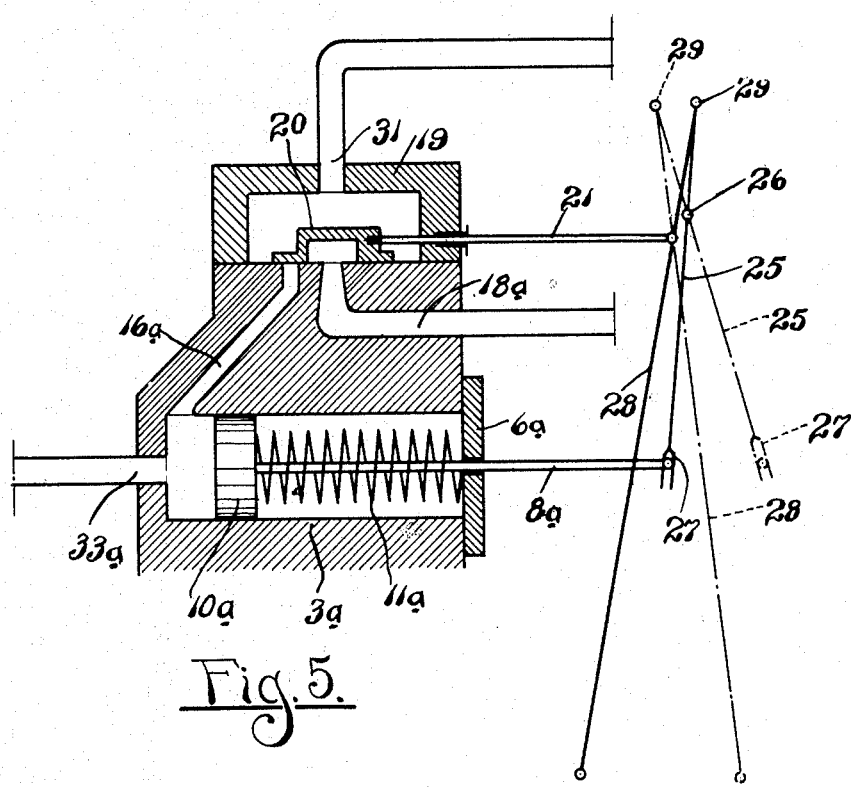
Fig. 5 is a fragmentary section and diagrammatic view of a simpler form of the apparatus but operating upon the same principle.

In the construction a base 1 of cast metal, preferably, is provided, at the opposite ends of which cylinders 2 and 3 are formed. The cylinder 2 is closed at its ends by heads 4 and 5 and the cylinder 3 by heads 6 and 7, as best shown in Fig. 2. A horizontal piston rod 8 extends between the cylinders through the adjacent heads 4 and 6 thereof and is equipped at one end, within the cylinder 2, with a piston 9 and at the other end, within the cylinder 3, with a piston 10.

A heavy coiled compression spring 11 bears at one end against the piston 9 and at the other end against a member 12 adjustably mounted within the cylinder 2 adjacent the head 5 thereof through which an adjusting screw 13 passes, whereby the member 12 may be adjusted different distances away from the head 5 and in this manner vary the force of the spring 11 and adjust it to any desired pressure strength.

A connecting pipe 14 made up of several elements, such as nipples, elbows and the like, connects the opposite ends of the cylinder 2. In said pipe a shut-off valve 15 is located which may be manually operated to open or close the passage to the pipe to any desired degree, this being for the purpose of effecting a dash-pot regulation of the movement of the piston 9 as will hereafter appear.

In the upper side of the cylinder 3 are two inlet ports 16 and 17 leading to opposite ends of the cylinder, and an exhaust port 18, very similar to the ports used in the ordinary reciprocating steam engine. A valve housing 19, similar to the steam chest in a steam engine, is attached to the upper side of the cylinder 3 covering the upper ends of all the ports described. A sliding valve 20, similar to the slide valve used in reciprocating steam engines, is mounted in the valve housing 19 to which a valve rod 21 is secured extending outward toward the opposite cylinder 2. Sliding movement of the valve 20 may uncover either port 16 or 17 dependent upon the direction in which the valve is moved and when either of the ports 16 or 17 is fully uncovered the other port 16 or 17 is connected with the exhaust port 18 as is evident.

A bracket 22 extends outwardly from the cylinder 3 on which an operating lever 23 is pivotally mounted between its ends. A second bracket 24 extends from the cylinder 2 to a point substantially midway between the two cylinders on which a lever 25 is pivotally mounted between its ends at 26. The lower end of the lever 25 below the pivot 26 is formed with a fork 27 which embraces the piston rod 8 to which it is pivotally connected, as best shown in Fig. 3. A bar 28 is pivotally connected at its upper end at 29 to the upper end of the lever 25, extends downwardly between the cylinders and has its lower end connected with the lower end of the operating lever 23 by a tie rod 30.

Links 21a connect the valve rod 21 with the bar 28.

A fluid under pressure, such as compressed air or the like, leads from any suitable source of supply through a pipe 31 to the valve housing 19. When the valve is in the position shown in Fig. 2, the fluid under pressure cannot enter either of the ports 16 or 17. By grasping the upper end of the operating lever 23 (referring to Fig. 2) and moving it to the left, the bar 28 is turned in a counterclockwise direction about its pivot 29 thereby drawing the links 21a with it and moving the slide valve 20 to uncover the port 16, whereupon compressed fluid passes through said port into the left-hand end of cylinder 3. This cylinder 3 has an outlet 33, (see Fig. 4) through which the compressed fluid may be carried by any suitable conduit connected with the cylinder at said outlet to the brake or other mechanism which is to be acted upon by pressure. When the pressure at the left of the piston 10 reaches a certain predetermined amount, sufficient to overcome the spring 11, the piston 10 with the rod 8, and also the piston 9, are moved to compress spring 11 with a consequent turning movement of the lever 25 about its pivot 26 thereby moving the pivot 29 to the left with a consequent movement of the valve 20 to the left to cover or partly cover the upper end of the port 16. This cuts off all or a part of the flow of the fluid through the port 16 to the cylinder 3 with a consequent reduction in pressure, and eventually the port 16 will be opened just sufficient that the pressure acting upon the piston 10 will balance the spring pressure of the spring 11 and there will be uniform and constant pressure of the fluid in the cylinder 3 and to the brake or other device acted upon thereby, the degree of this pressure varying with the position of the lever 23 and its associated parts.

If on the other hand, the upper end of the lever 23 is turned in a clockwise direction to the right, the port 17 will be opened to receive the compressed fluid. Piston 10 will immediately move to the left, there will be no resisting spring pressure and the flow of fluid through the port 17 will be uncontrolled in any manner whereby pressure acting upon the brake or other apparatus will be that of the source of supply of the fluid. The right-hand end of cylinder 3 is provided with an outlet port 34 to which a pipe or other conduit may be connected to carry the compressed fluid to its place of use. The outlet at 32 is connected with the exhaust port 18 and a conducting pipe may or may not be connected to the cylinder at such opening.

The pipe 14 connecting opposite ends of the cylinder 2 with the valve 15 therein, serves to check too rapid operation of the apparatus. That is, operation of the operating lever 23 cannot take place quickly or rapidly, as the flow of fluid from one end of cylinder 2 to the other past the valve 15 will check any such attempted operation. After the lever has been moved to open the port 16 and the pressure of the fluid balanced against the spring 11 is applied to the brake or other device, release may be effected by moving the lever 23 backward past its neutral point to a position where its associated parts will move the valve 20 to communicate the port 16 with the port 18 through which the pressure is released.

In Fig. 5 a diagrammatic form of a simpler construction is shown eliminating the cylinder 2 and also eliminating the possibility of uncontrolled pressure. In this case the compression spring 11a is located in the cylinder 3 between the piston 10a and the head 6a of the cylinder. The inlet port 16a and the outlet 33a correspond to the port 16 and outlet 33 of the first described device. The exhaust port 18a corresponds to the exhaust port 18 of the structure first described. The slide valve 20, the piston rod 8a, valve rod 21 and the various levers and bars 25 and 28 with the forked connection at 27 of lever 25 to the piston rod 8a is similar in all respects to the structure first described. The operation of the device is identical with that first described excepting that the operating lever will be moved in one direction only as there is no part corresponding to the port 17 to introduce the compressed fluid into the right-hand end of the cylinder. Consequently there is no means present for applying uncontrolled pressure to the brake or other device with which it is used.

The extent of movement of the lever 23 in the first instance controls the pressure which eventually will be constantly applied to the brake or other apparatus influenced thereby. By moving the lever 23 to operate valve 20 a greater or less distance, so that the port 16 is uncovered either partly or entirely, it is evident that the controlled pressure exerted will be greater or less in proportion to the extent of operation of the lever 23, this, irrespective of what the pressure may be in the source of supply of the compressed fluid.

This invention is very practical and efficient for the purpose for which it is designed. It is durable and is of compact form. The invention is defined in the appended claims and is to be considered comprehensive of all forms of structure coming within their scope.

I claim:

1. In a construction of the class described, a cylinder, a valve housing connecting with said cylinder, a piston in the cylinder, a valve in the valve housing, there being a port connecting said valve housing and one end of the cylinder with the valve adapted in one position to cover the port, a piston rod extending from said piston, a valve rod extending from said valve, spring means tending to move the piston toward the port end of the cylinder, a lever pivotally mounted between its ends on a fixed pivot and having connection at its lower end with said piston rod, a bar pivotally connected at its upper end to the upper end of said lever, means connecting the valve rod with said bar, and manually operable means for turning said bar about its point of pivotal connection to said lever to thereby change the position of said valve.

2. An apparatus of the character described comprising, a horizontal cylinder, a valve housing connected with said cylinder at its upper side into which fluid under pressure is adapted to be carried, there being a port connecting said valve housing with one end of the cylinder, a piston located within the cylinder, a piston rod extending from said piston through an end of the cylinder, a slide valve mounted in the valve housing adapted in one position to cover said port, a valve rod connected to said valve and extending through the end of the valve housing above the piston rod, a fixed support, a vertical lever pivotally mounted between its ends on said support at a point a short distance above said valve rod, a vertical bar pivotally connected at its upper end to the upper end of the lever and extending downwardly to a point below said cylinder, means pivotally connecting the lower end of said lever with the piston rod, a link connection between said valve rod and said bar at a point between the ends of the bar, means connected with the lower end of the bar for manually moving it to different positions, and spring means tending to move said piston toward the port end of the cylinder.

3. In a construction of the class described, a horizontal cylinder having closed ends, a second horizontal cylinder having closed ends located in alinement with the first cylinder, a piston in each cylinder, a piston rod connecting said pistons, a compression spring located between the piston in the second cylinder and one end of said cylinder tending to move both pistons lengthwise of said cylinders in one direction, a valve housing located at the upper side of the first cylinder, there being a port connecting said valve housing and the end of said cylinder toward which its piston normally moves, means for carrying a fluid under compression into said valve housing, a slide valve mounted in the housing adapted to cover or uncover said port, a valve rod extending from the slide valve, a vertical lever pivotally mounted between its ends on a fixed pivot and having pivotal connection at its lower end to said piston rod at a point between said cylinders, a vertical bar pivotally connected at its upper end to the upper end of the lever and extending downwardly to a point below the cylinders, a link connection between said valve rod and said bar at a point between the ends of said bar, and means for manually moving said bar about its pivot to different positions.

4. A construction containing the elements in combination defined in claim 3, there being a second port leading from said valve housing to the opposite end of the first cylinder over which said valve moves to close or open the same, and an exhaust port between said first and second ports, for the purposes described.

5. A construction containing the elements in combination defined in claim 3, combined with an adjusting screw threaded through the outer head of the second cylinder, and a member located within said second cylinder adjacent said outer head thereof adapted to be adjusted toward or away from said head by the adjusting screw, said compression spring being located between the piston in said second cylinder and said member.

6. A construction containing the elements in combination defined in claim 3, combined with a pipe conduit connecting the opposite ends of the second cylinder, and a valve located within said conduit adapted to be opened or closed to govern the effective area of the conduit.

7. In a construction of the class described, a horizontal cylinder, a second horizontal cylinder in alinement therewith, a piston in each cylinder, a piston rod connecting said pistons, a valve housing located at the upper side of the first piston there being inlet ports connecting said valve housing with the opposite ends of the cylinder and an exhaust port located between the inlet ports, a slide valve mounted in said valve housing to move back and forth over said ports, means for carrying a compressible fluid under compression into said valve housing, a vertical lever pivotally mounted on a fixed pivot between its ends having pivotal connection at its lower end with the piston rod, a vertical bar pivotally connected at its upper end to the upper end of said lever and extended to a point below said cylinders, a link connection between said bar and the valve rod, a second bracket extending from the first cylinder, a vertical lever pivotally mounted between its ends thereon, a rod connecting the lower end of the last mentioned lever and the lower end of the bar, and a heavy compression spring located in the second cylinder between its piston and the outer head of the cylinder, said first cylinder having outlets at each end thereof for the passage of the compressible fluid therefrom when it passes from the valve housing through said ports into the cylinder.

8. An apparatus of the class described comprising a cylinder, a piston in the cylinder, a passage communicating with said cylinder near one end, a valve in said passage, an outlet passage communicating with said cylinder, spring means to move the said piston toward the inlet passage in the cylinder, a lever pivoted between its ends on a fixed pivot, means connecting one end of said lever to said piston, a manually operable lever pivoted to the opposite end of the fixed lever and means connecting said valve to said manually operable lever whereby movement of either of said levers will cause movement of said valve.

9. An apparatus of the class described comprising a cylinder, a piston in the cylinder, two inlets, one communicating with each end of the cylinder, two outlet passages, one at each end of the cylinder, a valve chamber having a valve therein arranged to close both inlet ports or to open either of them by movements in opposite directions, a supply pipe communicating with said valve chamber, spring means acting to move the piston toward one end of the cylinder, manual means for moving the valve in either direction, and automatic means associated with said manual means and actuated by the piston for moving the valve in either direction.

10. The elements in combination defined in claim 9 combined with means for restricting the speed of movement of the piston in either direction.

In testimony whereof I affix my signature.

FRED BAUMGARTNER.